US008041586B2

(12) United States Patent
Jethani et al.

(10) Patent No.: US 8,041,586 B2
(45) Date of Patent: Oct. 18, 2011

(54) SHARED SPACE AVAILABILITY BY DYNAMICALLY RESPONDING TO USER UTILIZATION BEHAVIOR OF SHARED SPACE

(75) Inventors: Seema V. Jethani, Raleigh, NC (US); Rosalind T. A. Radcliffe, Durham, NC (US); David L. Schmidt, Cary, NC (US); Janusz S. Stanson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/233,221

(22) Filed: Sep. 18, 2008

(65) Prior Publication Data
US 2010/0070314 A1    Mar. 18, 2010

(51) Int. Cl.
*G06Q 10/00* (2006.01)
(52) U.S. Cl. ............................................. 705/5; 705/6
(58) Field of Classification Search ............. 705/5–6
See application file for complete search history.

(56) References Cited

U.S. PATENT DOCUMENTS

| | | | |
|---|---|---|---|
| 7,343,312 B2 * | 3/2008 | Capek et al. ............ 705/7.19 |
| 2001/0037229 A1 * | 11/2001 | Jacobs et al. ............... 705/8 |
| 2001/0051885 A1 * | 12/2001 | Nardulli et al. ............ 705/6 |
| 2005/0071213 A1 * | 3/2005 | Kumhyr et al. ............. 705/8 |
| 2005/0114167 A1 * | 5/2005 | McEvoy ................... 705/1 |
| 2006/0294043 A1 * | 12/2006 | Taisdeal .................... 707/1 |
| 2007/0162315 A1 * | 7/2007 | Hodges ..................... 705/8 |
| 2007/0299966 A1 * | 12/2007 | Crawford et al. ........ 709/224 |
| 2008/0109289 A1 * | 5/2008 | Vivadelli et al. ............ 705/7 |

OTHER PUBLICATIONS

"Booking Software, Room Scheduler", Meeting Room Manager Scheduling Software, NetSimplicity, viewd Apr. 11, 2008.
"EmergingSoft-MeetingPlanner Overview," Emergingsoft, 2007.
"Campus Center Usage and Reservations Policies," Emerson College, 2008.
"Rendezvous Web Based Scheduling Software for Conference and Meeting Room Management", NFS Hospitality, 2007.

* cited by examiner

*Primary Examiner* — John Hayes
*Assistant Examiner* — Tonya Joseph
(74) *Attorney, Agent, or Firm* — Patents on Demand, P.A.; Brian K. Buchheit; Scott M. Garrett

(57) ABSTRACT

The present invention discloses a solution for improving shared space availability by dynamically responding user utilization behavior of shared space. In the system, automated sensors within a shared space can be used to detect when spaces are in use. Sensors such as motion detectors, infrared sensors, cameras, and the like can correlate space usage to a reservation system. When a space is reserved by a user, the system can verify space occupancy according to the reservation. If the space is unoccupied and the reservation time has not expired, the space can be automatically freed. If the excess time before reservation expiration is more than a threshold value (e.g., fifteen minutes) the system can penalize the user. Penalties can be applied for users that do not utilize reservations.

2 Claims, 4 Drawing Sheets

US 8,041,586 B2

SHARED SPACE AVAILABILITY BY DYNAMICALLY RESPONDING TO USER UTILIZATION BEHAVIOR OF SHARED SPACE

BACKGROUND

The present invention relates to the field of collaboration and resource scheduling and, more particularly, to improving shared space availability by dynamically responding user utilization behavior of shared space.

Shared spaces such as conference rooms, workrooms, and shared office space require careful management to be effectively utilized. In many instances, shared office spaces that are not carefully monitored tend to be over-scheduled and under-utilized. When scheduling mechanisms are in place, users are incited to reserve a maximal amount of time for a shared space. When too many users behave in this manner, the available shared space becomes scarce as its utilization goes down.

Further, users often reserve shared space with the intention of utilizing the space. However, complications can arise and users can forget and/or miss their reservation and the space can go unused. When this occurs, other users are typically unaware that the space is not in use and are forced to wait or use other resources. What is needed is a mechanism to curb scheduling behavior that negatively affects shared space utilization.

DETAILED DESCRIPTION

Figure 1:
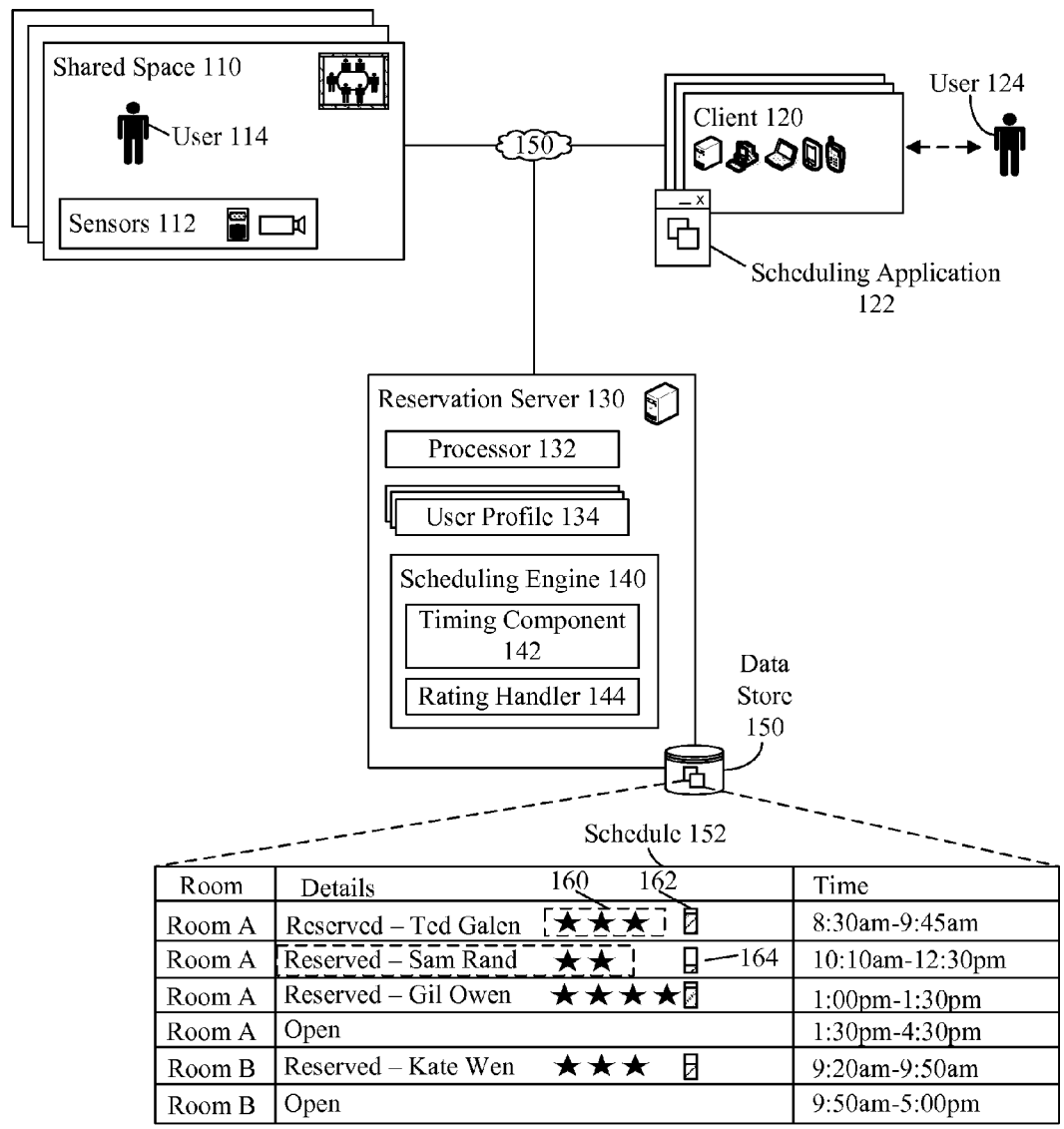
FIG. 1 is a schematic diagram illustrating a system for improving shared space availability by dynamically responding user utilization behavior of shared space in accordance with an embodiment of the inventive arrangements disclosed herein.

The present invention discloses a solution for improving shared space availability by dynamically responding user utilization behavior of shared space. In the system, automated sensors within a shared space can be used to detect when spaces are in use. Sensors such as motion detectors, infrared sensors, cameras, and the like can correlate space usage to a reservation system. When a space is reserved by a user, the system can verify space occupancy according to the reservation. If the space is unoccupied and the reservation time has not expired, the space can be automatically freed. If the excess time before reservation expiration is more than a threshold value (e.g., fifteen minutes) the system can penalize the reservation requester. Penalties can be applied for those reservation requesters that do not utilize reservations.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for improving shared space availability by dynamically responding user utilization behavior of shared space in accordance with an embodiment of the inventive arrangements disclosed herein. In system 100, a reservation server 130 able to reclaim shared space from unused reservation 164 can facilitate effective use of managed space 110. Utilizing sensors 112, system 100 can determine when managed space 110 is reserved and the reserving user is not present. Based on reservation schedule 152 in data store 150, server 130 can assess when reservations are not fulfilled and when space 110 is over-scheduled. For instance, schedule 152 information can be used to determine when user 114 is not present in managed room 110. When user 114 misuses space 110, rating 160 associated with the user 114 can be adjusted to reflect usage behavior. Usage behavior can be aggregated along with reservation specific information to determine confidence indicator 162. Indicator 162 can be presented within schedule 152 which can help user 124 determine when a reservation can potentially go unfulfilled.

As used herein, shared space 110 can include shared resources such as shared office space, shared workspace, conference rooms, designated shared space within facilities, and the like. Sensors 112 can include, but are not limited to, motion detectors, infrared sensors, thermal sensors, security cameras, and the like. Alternatively, system 100 can utilize Global Positioning System (GPS) enabled devices to determine user presence. In one embodiment, Radio Frequency Identification (RFID) technology can be used to determine when a user 114 accesses resource 110.

Scheduling application 122 can present schedule 152 and enable user 124 to react to reservations changes. Schedule 152 can be conveyed to client 120 via network 150 allowing users to review reservation details. Using application 122, user 124 can respond to dynamically freed space 110. For instance, if user 114 fails to utilize reservation of space 110, user 124 can be notified by application 122 of recently freed space 110. Further, application 122 can facilitate user creation, modification, and deletion of reservations in system 100. In one embodiment, application 122 can be a calendaring and/or collaboration application such as LOTUS NOTES.

Reservation server 130 can be utilized to assist user 124 to reserve one or more time slots of managed space 110. Server 130 can permit reservations by a proxy agent (e.g., co-worker) which can be managed in a manner analogous to non-proxy reservations. Similar to traditional resource management systems, users can be permitted to create a recurring set of reservations which can be managed by server 130. Server 130 can be comprised of processor 132 user profile 134, and scheduling engine 140. Profile 134 can be used by server 130 to track user 114, 124 attendance for single and/or multiple reservations. Engine 140 can employ this information to intelligently manage reservation of resource 110. For instance, if user 124 reserves space 110 for a meeting with user 114 but user 124 fails to appear, server 130 can detect user 114 presence and apply a rating penalty to user 124. In this instance, space 110 can remain reserved until user 114 leaves space 110 for a significant amount of time (e.g., ten minutes).

Processor 132 can be used to process presence information obtained from sensors 112 to determine user presence within managed space 110. Processor 132 can include hardware/software components for identifying users 114,124. In one embodiment, RFID detector input can be conveyed to processor 132 which can correlate information with user profile 134 to identify users. Other embodiments are contemplated for identifying users such as utilizing presence aware computing devices, biometrics, voice recognition, face recognition, and the like.

User profile 134 can allow user identification, tracking, and logging useful in maintaining efficient employment of space 110. Profile 134 can include a user rating 160 value, confidence indicator 164 values, reservation privileges, attendance history, and configuration information. User 114 arrival and departure times can be recorded in profile 134 to create a user attendance history. Departure time can be correlated against reservation details in schedule 152 to determine when a user has over-scheduled space 110.

Rating 160 can be used by system 110 to permit or deny reservations of managed space 110. Rating 160 can be a computed value based on the user history stored in user profile 134. Rating 160 can be used by other users to gauge the likelihood a reservation will be kept based on historical user behavior. Depending on administrative configuration of server 130, rating 160 can be publicly visible or can be visible only to the user for which the rating applies. For instance, when rating 160 is publicly visible, user 124 can quickly determine the ranking (e.g., past behavior) of a user within the system. As illustrated herein, rating 160 can be presented graphically and/or textually which can be user configured. For instance, rating 160 can be presented as five star grading scale denoted by a set of star images.

Confidence indicator 162 can represent a calculated value for the likelihood a reservation will be kept. Depending on server 130 configuration, confidence indicator 162 reflect expected user behavior for a specific reservation 164, behavior for all reservations within a set, and the like. Users can utilize this information to make intelligent decisions about reserved space 110. For instance, when reservation 164 confidence indicator is low, Sally (e.g., user 124) can contact Sam to confirm if the reservation 164 will be used. In one embodiment, entry 164 can be an interface element (e.g., hyperlink) enabling users to message the user associated with the reservation by interacting with the element.

In one embodiment, ratings 160 and confidence indicator 162 can be combined into a single indicator. This indicator can be presented in the same manner rating 160 and indicator 162 are presented in system 100. The combined indicator can perform the functionality of rating 160 and indicator 162 or any part thereof.

Scheduling engine 140 can be used to govern managed space 110 usage based on user 114,124 behavior. For instance, when a user rating exceeds a threshold value, the server 130 can be configured to deny reservations from the user. Alternatively, administrator intervention can be required before the user is able to reserve space 110 when the user rating exceeds the threshold value. In one embodiment, during high utilization and/or demand of space 110, users with a low rating can be restricted to smaller time segments that during low utilization periods. For example, user 124 can be restricted to be able to only reserve one hour of space 110 in a period of twenty four hours.

Timing component 142 can be a hardware/software component able to determine the duration of time for which a user is absent within a shared space 110. When the duration of time exceeds a threshold value (e.g., twenty minutes), the user can be logged as absent, and the engine 140 can flag space 110 as free. The duration for which the space 110 can be flagged as free can be computed by component 142 based on upcoming reservations, demand for space 110, and the like. For instance, space 110 can be flagged as available until the start time of a subsequent reservation.

Rating handler 144 can be used to compute rating changes based on user space 110 utilization. The handler 144 can be configured to adjust user rating algorithmically based on a combination of variables. Variables can include number of total missed reservations, number of missed reservations from a set, and the like. For instance, missing one reservation out of a recurring set of seven reservations can result in a less severe penalty than missing a single meeting. Conversely, missing seven reservations out of a recurring set can result in a more severe penalty than missing seven individual reservations.

Drawings presented here are for illustrative purposes only and should not be construed to limit the invention in any regard. Although server 130 is presented as a stand-alone entity, other configurations are contemplated. Server 130 functionality can be expressed within a distributed computing system, a networked computing configuration, Web service, and the like.

Figure 2A:
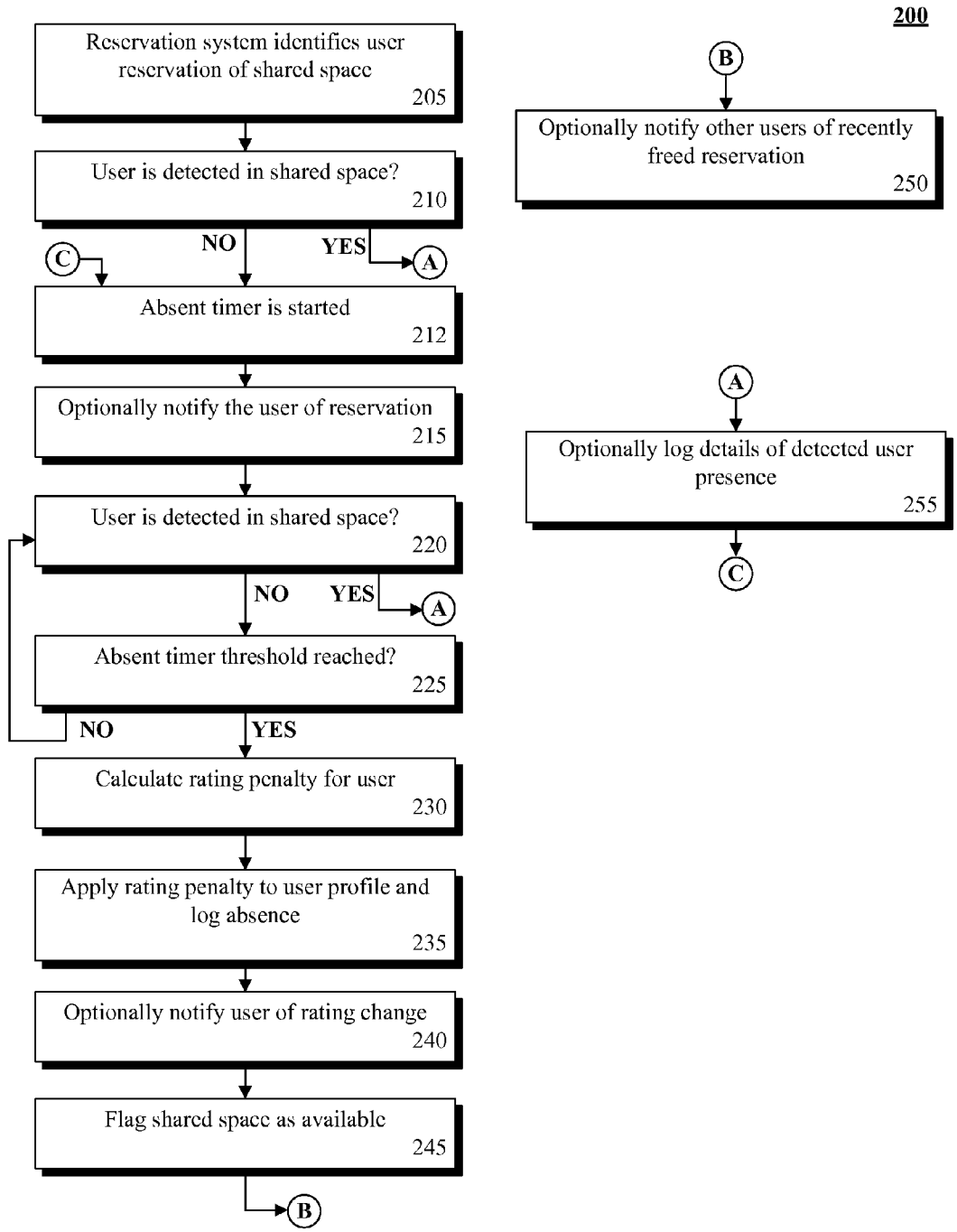
FIG. 2A is a flowchart illustrating a method for improving shared office space availability in accordance with an embodiment of the inventive arrangements disclosed herein.

FIG. 2A is a flowchart illustrating a method 200 for improving shared office space availability in accordance with an embodiment of the inventive arrangements disclosed herein. Method 200 can be performed in the context of system 100. In method 200, a reservation system can facilitate equitable use of shared space through automated resource management. When a user reserves a shared resource such as a conference room, the reservation system can utilize presence information to determine if the reservation was kept. Additionally, the system can determine if the user over-scheduled time for the resource. Penalties for over-scheduling and unused reservations can be addressed through assigning a rating value to users. Ratings can be used by other users to assess the likelihood a user will utilize a reservation. Further, ratings can affect a user's ability to reserve space, limit the amount of time a space can be reserved for, and the like.

In step 205, a reservation system identifies a user reservation of a shared space. In step 210, if a user is detected in a shared space the method can proceed to step 255, else continue to step 212. The user can be detected in one or more ways such as using presence information gained from Global Positioning System (GPS) capable devices. In step 212, an absent timer is started for the user's reservation. The absent timer can be a timer used to determine the time elapsed since the start of the user's reservation. In step 215, the user can be optionally notified of the reservation commencement. The system can notify the user via email, Short Message Service (SMS), text exchange, and the like. In step 220, if the user is detected in the shared space, the method can proceed to step 255, else continue to step 225.

In step 225, if the absent timer threshold value has been reached, the method can continue to step 230, else return to step 220. The timer threshold value can be an administratively set value for determining when a reservation should be canceled and the shared space designated as free. For instance, after thirty minutes of vacancy, a conference room can be flagged as available for users to reserve. In step 230, the system can calculate a rating penalty for the user.

The rating penalty can be a calculated value based on one or more inputs such as, frequency of missed reservations, demand for the reserved shared space, and the like. In step 235, the rating penalty can be applied to the user profile and the absence can be logged. In step 240, the system can optionally notify the user of rating change based on user profile configuration. In step 245, the shared space can be flagged as available and the users can be permitted to reserve the newly allocated space. In step 250, users can be optionally notified of recently freed space.

In step 255, if the user presence is detected in the reserved shared space, the system can optionally log details. Details can include date, time, number of people detected, and the like. The method can return to step 212 to determine when an over-scheduling of the shared space has occurred. Based on steps 212-225 presence information gathered can allow the system to detect if there is excess time unused from the reservation. In step 230-250, the system can determine if an over-scheduling has occurred and take the appropriate actions such as applying an appropriate rating penalty.

Figure 2B:
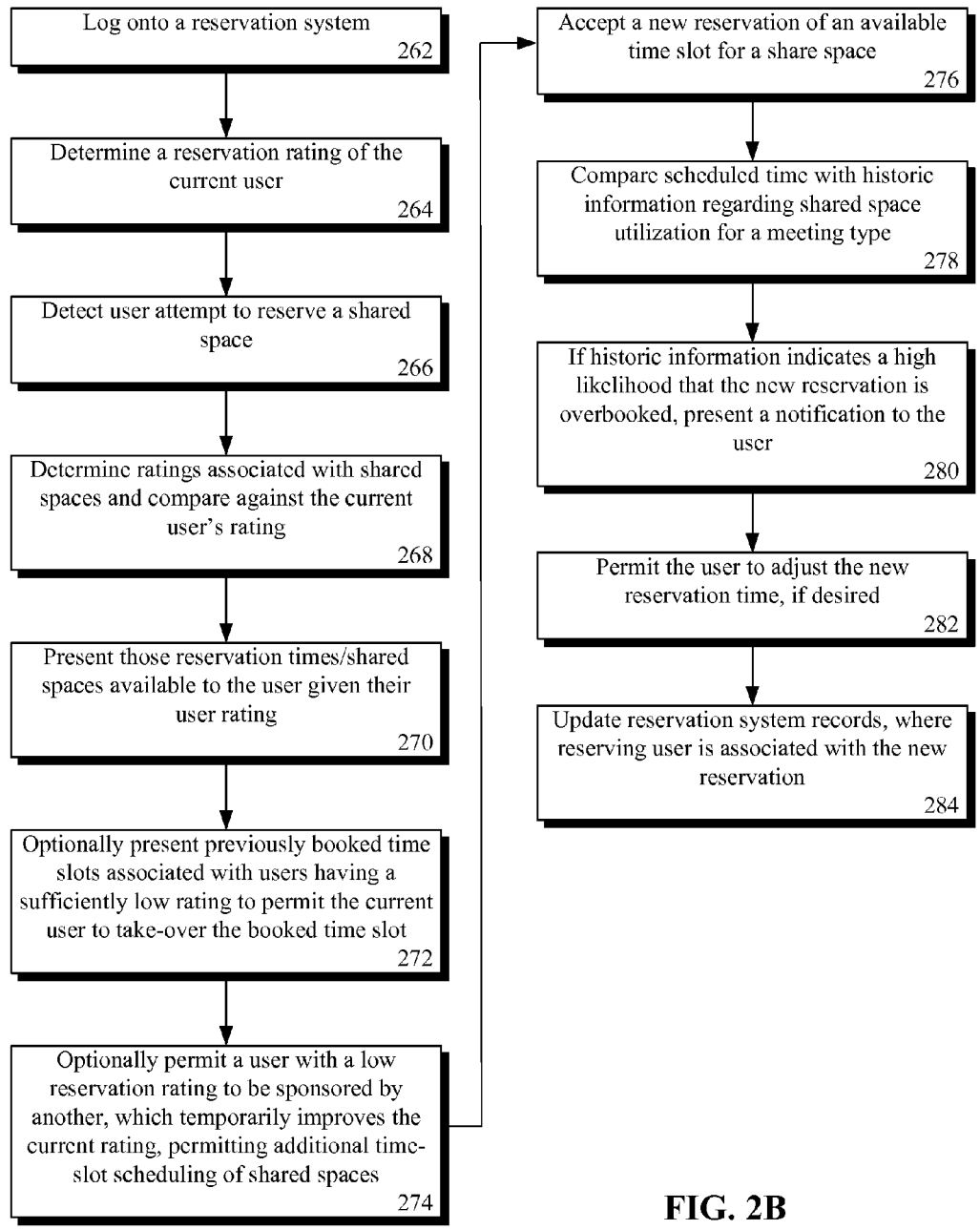
FIG. 2B is a flowchart illustrating a method for a reservation system that grants preferential treatment to different users based upon user reservation ratings in accordance with an embodiment of the inventive arrangements disclosed herein.

FIG. 2B is a flowchart illustrating a method 260 for a reservation system that grants preferential treatment to different users based upon user reservation ratings in accordance with an embodiment of the inventive arrangements disclosed herein. Method 260 can be performed in the context of system 100.

Method 260 can begin in step 262, where a user can log onto a reservation system. In step 264, a reservation rating of the current user can be determined. This reservation rating affects options and/or reservation time slots for shared spaces available to the user. In step 266, a user attempt to reserve a shared space can be detected. For example, a user can navigate to a reservation screen that is to present all available shared spaces that the user is able to reserve.

In step 268, ratings associated with shared spaces can be compared against a user's rating. This assumes that rating specific limitations are imposed upon one or more shared spaces. For example, highly demanded shared spaces and times can require a higher reservation rating than less demanded shared spaces and times, which rewards users with high reservation ratings relative to users with low reservation ratings. In step 270, the reservation times/shared spaces available to a user given their user rating can be presented. In one embodiment, a user with a high reservation rating may be able to take-over already booked reservation times made by users with sufficiently low reservation ratings, as shown by optional step 272. In another embodiment, a user with a relatively low reservation rating can be sponsored by another (e.g., a supervisor having a high reservation rating), which temporarily improves an effective rating to permit a scheduling of a shared space at a time that would otherwise not be available given the current user's rating, as shown by optional step 274. A variety of other behaviors intended to bias reservations made in a reservation system to a set of users having better reservation ratings can be implemented. Those presented herein are intended for illustrative purposes only and the described behaviors are not to be construed as a limitation of the disclosure.

In step 276, the reservation system can accept a new reservation of an available time slot for a shared space. In optional step 278, the scheduled time can be compared with historic information regarding shared space utilization for meetings of that type and/or for meeting involving the designated participants. If the historic information indicates a high likelihood that the new reservation is overbooked, a notification to this effect can be presented to the user, as shown by step 280. In step 282, the user can be permitted to adjust the reservation time responsive to receiving the prompt. Once the reservation has been finalized, records of the reservation system can be updated, as shown by step 284. The stored reservation can be associated with the reserving user, so that actual utilization can be tracked and used to adjust the reserving user's reservation rating.

Figure 3:
FIG. 3 is a schematic diagram illustrating an interface for improving shared space scheduling through dynamically reclaiming unused reservation time in accordance with an embodiment of the inventive arrangements disclosed herein.

FIG. 3 is a schematic diagram illustrating an interface 300 for improving shared space scheduling through dynamically reclaiming unused reservation time in accordance with an embodiment of the inventive arrangements disclosed herein. Interface 300 can be presented within the context of system 100. In interface 300, a user can be assisted in reserving shared space by a reservation system able to detect and free unfulfilled reservations. Reservation interface 310 can enable users to identify possible unfulfilled reservations during a reservation process and allow action to be taken. Pop-up dialog 340 can be used to notify the user of potential over-scheduling behavior that can affect future reservation privileges.

Interface 310 can be a rating aware reservation interface able to present a user with information about shared space utilization. Based on the available time slots, users can select to reserve a time slot for a shared space using interface artifact 320,322. In one embodiment, shared space and/or time slots can be controlled based on ratings, allowing only users to reserve a space only if a rating requirement is met. For instance, reserve button 322 can allow the user to book Room A because the user rating 312 is higher than the required rating 321. In instances where users are unable to reserve space due to rating requirements, non-interactive interface artifacts (e.g., button 324) can be presented in place of interactive ones. For example, button 324 can be presented as a "grayed out" version of button 322 to indicate to the user that their rating is not sufficient to reserve the space.

When the probability of a reservation being fulfilled is below a threshold value, the interface 310 can present an interface artifact to allow users to act on this scenario. For instance, notify button 320 can be presented when the confidence value for reservation 325 is below a value of twenty five percent. A user interacting with artifact 320 can be notified of space vacancy if the reservation is not kept. This can allow users to effectively use time slots that can go unused in traditional shared space reservation systems.

During the reservation process, pop-up dialog 340 can be presented when the system detects the user has exceeded a range of time (e.g., two hours). The range can be a system setting controlled by an administrator or be a heuristically determined value based on user shared space usage patterns. For instance, dialog 340 can be shown when a user has scheduled a space for one hour when historically has only reserved spaces for thirty minutes. Notification 342 can be presented to the user which can alert the user of a potential over-schedule. To assist the user, an artifact 344 can be presented which allows the reservation system to estimate an appropriate reservation time slot. Artifact 344 functionality can be gained through loosely coupled components such as networked applications, Web services, and the like.

Drawings presented herein, are for illustrative purposes only and should not be construed to limit the invention in any regard. Interfaces 310, 340 can include, but is not limited to, a graphical user interface (GUI), Voice User Interface (VUI), textual interface, multi-modal interface, and the like. Artifacts 320, 322, 344 are not limited to interactive buttons and can be presented using drop-down menus, context menus, pull down menus, checkbox artifacts, radio select artifacts, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for efficient use of managed shared space comprising:
    identifying, by executing computer program code stored in a non-transient medium, a reservation associated with at least one of a start time index, an end time index, a user, a utilization entry, and a shared space, wherein the shared space is one of a shared office space, a conference room, or a shared workspace;
    determining, by executing computer program code stored in a non-transient medium, at least one timeout value associated with the reservation;
    detecting, by executing computer program code stored in a non-transient medium, a user absence within a shared space when a timeout value threshold is reached; and
    performing, by executing computer program code stored in a non-transient medium, a programmatic action in response to user absence, wherein the programmatic action results in a dynamic modification of the reservation that frees the shared space scheduled by one user and automatically assigns the shared space to a different user, and wherein the programmatic action results in a change of at least one element associated with a user profile that applies a rating penalty to the one user as a direct result of the one user being absent from the shared space between a start time indicated by the start time index and an end time indicated by the end time index
    determining a departure time of the one user from the shared space using sensors of the shared space;
    correlating a departure time of the one user from the shared space against reservation details, specifically a time indicated by the end time index;
    determining whether the one user has over-scheduled the shared space based on results of correlating the departure time; and
    applying the rating penalty to the one user when over-scheduling has occurred.

2. A method for efficient use of managed shared space comprising:

establishing a reservation for a shared space within a reservation server comprising hardware, wherein said reservation is associated with a plurality of different users each listed as an attendee, wherein said reservation designates the shared space, a start time, and an end time;

monitoring the shared space using a plurality of sensors;

processing via a processor input obtained from the sensors to determine an identity of individuals present in the shared space between the start time and the end time; and assessing rating penalties on those ones of the different users that fail to be in the shared space between the start time and the end time and not applying rating penalties on those ones of the different users that appear within the shared space between the start time and the end time, wherein rating penalties cause users to be negatively affected when scheduling shared spaces via the reservation server.

determining a departure time of the one user from the shared space using sensors of the shared space;

correlating a departure time of the one user from the shared space against reservation details, specifically a time indicated by the end time index;

determining whether the one user has over-scheduled the shared space based on results of correlating the departure time; and applying the rating penalty to the one user when over-scheduling has occurred.

\* \* \* \* \*